(12) United States Patent
Poliquin et al.

(10) Patent No.: US 6,732,895 B2
(45) Date of Patent: May 11, 2004

(54) INTEGRATED STORAGE APPARATUS FOR VEHICLE CARGO COMPARTMENTS

(75) Inventors: Duane Poliquin, Brighton, MI (US); Robert Mamo, Livonia, MI (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/365,337

(22) Filed: Feb. 12, 2003

(65) Prior Publication Data

US 2004/0020957 A1 Feb. 5, 2004

Related U.S. Application Data

(60) Provisional application No. 60/400,277, filed on Jul. 31, 2002.

(51) Int. Cl.[7] .................................................. B60R 5/00
(52) U.S. Cl. .............................. 224/543; 220/6; 224/539
(58) Field of Search ................................ 224/543, 539; 296/37.5, 37.13, 37.14, 37.15, 37.16; 220/6, 7

(56) References Cited

U.S. PATENT DOCUMENTS

| | | | | |
|---|---|---|---|---|
| 1,451,468 A | * | 4/1923 | Olshan ........................ 220/6 |
| 3,126,236 A | * | 3/1964 | Buchan et al. ............... 312/201 |
| 4,848,498 A | * | 7/1989 | Hart et al. .................. 180/69.2 |
| 5,429,432 A | * | 7/1995 | Johnson .................... 312/235.3 |
| 5,501,384 A | | 3/1996 | Wisniewski |
| 5,669,537 A | | 9/1997 | Saleem et al. |
| 5,775,034 A | * | 7/1998 | Logue ......................... 52/36.1 |
| 6,027,155 A | | 2/2000 | Wisniewski et al. |

FOREIGN PATENT DOCUMENTS

WO    WO 92/05078    *    4/1992    ................. 224/543

* cited by examiner

*Primary Examiner*—Gregory Vidovich
*Assistant Examiner*—Maerena W. Brevard
(74) *Attorney, Agent, or Firm*—Myers Bigel Sibley & Sajovec

(57) ABSTRACT

Apparatus for storing items within vehicle compartments are provided and include cover panels that are pivotally secured to cargo compartment walls and are movable between a closed position covering a storage area and an open position substantially transverse to the wall allowing access to the storage area. One or more additional panels may be provided that are movable between respective stored positions and operative positions.

12 Claims, 5 Drawing Sheets

PRIOIR ART

INTEGRATED STORAGE APPARATUS FOR VEHICLE CARGO COMPARTMENTS

RELATED APPLICATION

This application claims the benefit of U.S. Provisional Application No. 60/400,277, filed Jul. 31, 2002, the disclosure of which is incorporated herein by reference in its entirety as if set forth fully herein.

FIELD OF THE INVENTION

The present invention relates generally to vehicles and, more particularly, to cargo management apparatus for use within vehicles.

BACKGROUND OF THE INVENTION

Motor vehicles are typically provided with a cargo storage compartment of some type. For example, sedan-style automobiles are conventionally equipped with a trunk. Sport/utility and mini-van vehicles, in which there are two or more rows of seating, are conventionally provided with a cargo storage area behind the last row of seating.

Items carried within vehicle cargo storage areas are often free to move about during vehicle operation, which may be undesirable. Cargo netting may be used to restrain items from movement within vehicle cargo storage compartments. While such netting may adequately restrain items from movement, cargo netting may require the use of two hands to hold the cargo netting back while placing items therewithin, which may be cumbersome.

Various devices are known for dividing vehicle storage compartments to prevent movement of items stored therein. For example, U.S. Pat. No. 6,027,155 to Wisniewski et al. describes a storage system for a vehicle cargo compartment that includes a cover that is removably attached to the floor of the cargo compartment and that is configured to rotate between open and closed positions. U.S. Pat. No. 5,669,537 to Saleem et al. describes a storage unit that extends between, and connects to, vehicle panels of a vehicle storage area. U.S. Pat. No. 5,501,384 to Wisniewski describes a storage system for a vehicle that includes a molded bin and a cover pivotally secured to the bin.

Unfortunately, these devices are somewhat complex and bulky and are not adapted to be compactly stored within the cargo storage area of a vehicle. Moreover, in automotive vehicles such as sport/utility vehicles and mini-vans, cargo storage space maybe somewhat limited. Accordingly, a need exists for a cargo storage device that can securely retain items within a cargo storage area during operation of a vehicle and that can be easily stored in an out-of-the-way location when not needed, and without requiring that the storage device be removed from the cargo storage area. In addition, a need exists to maximize the efficiency and utilization of existing cargo storage space without intruding on passenger space.

SUMMARY OF THE INVENTION

In view of the above discussion, an apparatus for storing items within vehicle compartments is provided and includes a cover panel that is pivotally secured to a cargo compartment wall and is movable about a substantially vertical axis between a closed position covering a storage area and an open position substantially transverse to the wall allowing access to the storage area. According to embodiments of the present invention, a second panel may be provided that is pivotally secured to the cover panel that is movable between a stored position in adjacent, face-to-face relationship with the cover panel and an operative position disposed substantially transverse to the cover panel and in overlying, face-to-face relationship with the floor. According to embodiments of the present invention, a third panel may be provided that is pivotally secured to the second panel and that is movable between a stored position wherein the third panel is in adjacent, face-to-face relationship with the second panel and an operative position wherein the third panel is substantially parallel with the second panel and in overlying, face-to-face relationship with the floor.

According to embodiments of the present invention, a fourth panel may be provided that is pivotally secured to the third panel and that is movable between a stored position in adjacent, face-to-face relationship with the third panel and an operative position adjacent to and substantially parallel with the cover panel when the cover panel is in its operative position. According to embodiments of the present invention, an extension panel may be provided that is slidably secured to the cover panel and that is movable from a stored position in adjacent, face-to-face relationship with the cover panel and an extended position substantially parallel with the cover panel.

According to embodiments of the present invention, one or more projections may be provided that extend from one or more of the various panels and that are configured to support articles suspended therefrom.

DETAILED DESCRIPTION OF THE INVENTION

Figure 1:
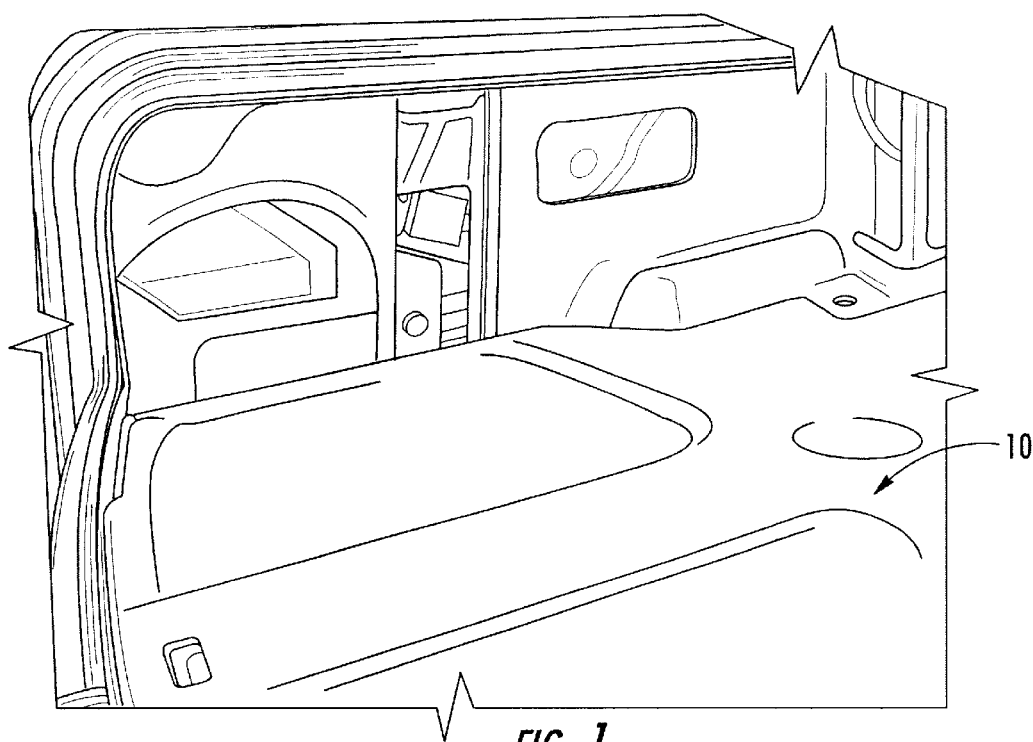
FIG. 1 is a perspective view of a portion of a conventional cargo compartment of a vehicle.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Figure 2:
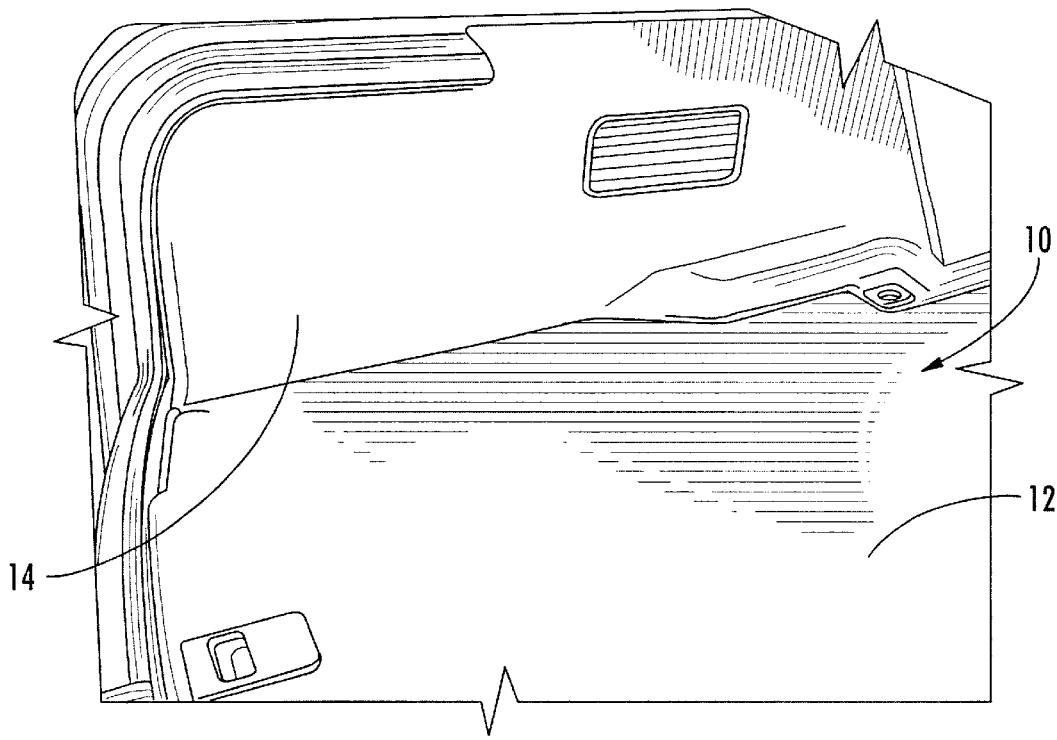
FIG. 2 illustrates a wall and load floor utilized in the cargo compartment of FIG. 1.

Referring to FIGS. 1–2, an exemplary vehicle cargo compartment 10 is illustrated. The illustrated vehicle compartment 10 is a trunk of an automobile. However, it is understood that embodiments of the present invention may be utilized in various compartments of various vehicles, such as the rear storage area of a mini-van, truck, and/or sport utility vehicle, without limitation.

FIG. 1 illustrates a conventional cargo compartment 10 prior to the installation of a load floor and walls. FIG. 2 illustrates the cargo compartment 10 of FIG. 1 with a load floor (hereinafter "floor") 12 and a wall 14 extending upwardly from the floor around the periphery of the floor 12. Portions of the wall 14 may be removable to permit access to items stored within the wall 14, such as jacks, tools, and the like.

Figure 3:
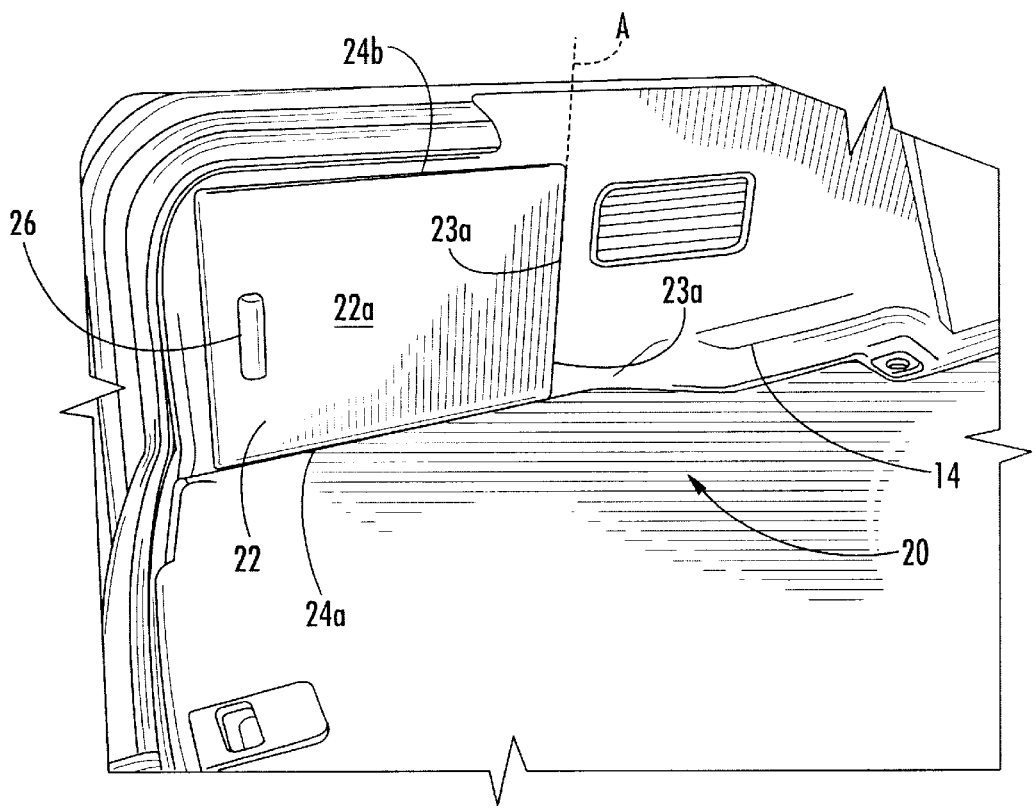
FIG. 3 is a perspective view of the cargo compartment of FIG. 1 having a storage apparatus according to embodiments of the present invention, and wherein a cover panel of the storage apparatus is in the closed position.
Figure 4:
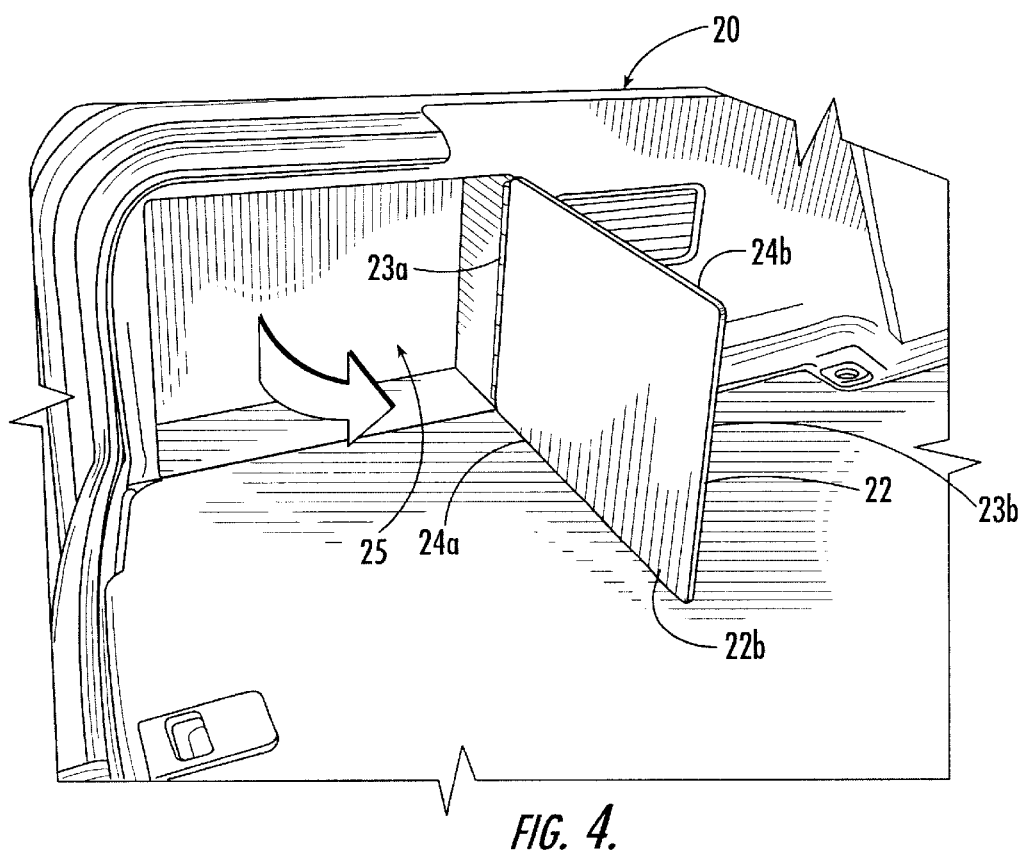
FIG. 4 is a perspective view of the storage apparatus of FIG. 3 wherein the cover panel is in an open position to allow access to the storage area in the wall.

FIGS. 3–4 illustrate a storage apparatus 20 according to embodiments of the present invention. The storage apparatus 20 includes a cover panel 22 that is pivotally secured to the cargo compartment wall 14 and that is movable about a substantially vertical axis A between a closed position (FIG. 3) covering a storage area 25 within the wall 14 and an open position (FIG. 4) wherein the cover panel 22 is substantially transverse to the wall 14 allowing access to the storage area 25. The illustrated cover panel 22 has a generally rectangular shape and includes front and rear surfaces 22a, 22b, opposite first and second end portions 23a, 23b, and opposite first and second edge portions 24a, 24b. In the illustrated embodiment, the cover panel 22 is pivotally secured to the wall 14 along the cover panel first end portion 23a. According to embodiments of the present invention, a handle 26 may be provided to facilitate movement of the cover panel 22 between open and closed positions.

A hinge of virtually any type may be utilized to pivotally attach the cover panel 22 to the wall 14 (or other vehicle component panel/component). According to embodiments of the present invention, an upholstery material or floor covering (e.g., carpeting) disposed on the wall 14 and on the cover panel front surface 22a may serve as a hinge.

The cover panel 22 may be configured to be substantially flush with the wall 14 when the cover panel 22 is in the closed position. Accordingly, the storage apparatus 20 may appear integral with a vehicle compartment 10 when the cover panel 22 is in the closed position. However, it is to be understood that embodiments of the present invention do not require the cover panel 22 to be flush with a vehicle cargo compartment wall 14. In addition, the cover panel 22 may be styled to reside at or inboard of a vehicle wheel well.

Figure 5:
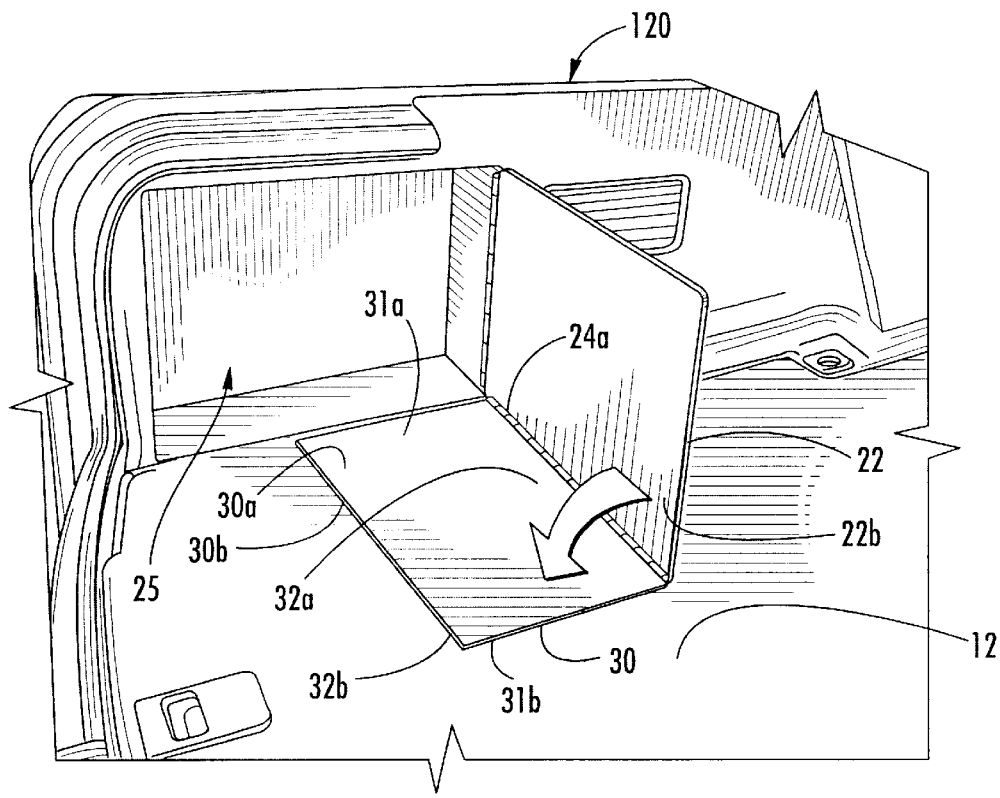
FIGS. 5–9 are respective perspective views of storage apparatus for vehicle cargo compartments according to additional embodiments of the present invention.

Referring to FIG. 5, a storage apparatus 120, of according to other embodiments of the present invention, includes a second panel 30 that is pivotally secured to the cover panel 22. The second panel 30 includes front and rear surfaces 30a, 30b, opposite third and fourth end portions 31a, 31b and opposite third and fourth edge portions 32a, 32b. The second panel 30 is pivotally secured to the cover panel first edge portion 24a along the third edge portion 32a. The second panel 30 is movable between a stored position wherein the second panel 30 is in adjacent, face-to-face relationship with the cover panel rear surface 22b and an operative position wherein the second panel 30 is disposed substantially transverse to the cover panel 22 and in overlying, face-to-face relationship with the floor 12 (FIG. 5).

A hinge of virtually any type may be utilized to pivotally attach the second panel 30 to the cover panel 22. According to embodiments of the present invention, an upholstery material or floor covering (e.g., carpeting) disposed on the second panel 30 and cover panel 22 may serve as a hinge.

Figure 6:
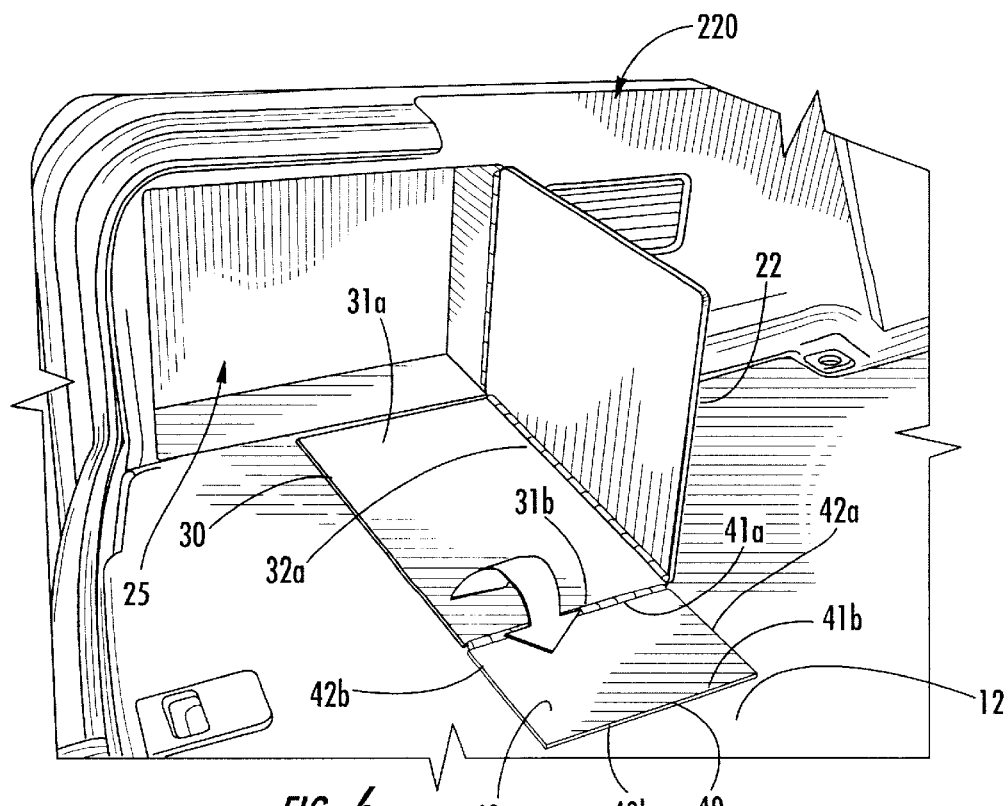

Referring to FIG. 6, a storage apparatus 220, according to other embodiments of the present invention, includes a third panel 40 that is pivotally secured to the second panel 30. The third panel 40 includes front and rear surfaces 40a, 40b, opposite fifth and sixth end portions 41a, 41b and opposite fifth and sixth edge portions 42a, 42b. The third panel 40 is pivotally secured to the second panel fourth end portion 31b along the fifth end portion 41a. The third panel 40 is movable between a stored position wherein the third panel 40 is in adjacent, face-to-face relationship with the second panel 30 and an operative position wherein the third panel 40 is substantially parallel with the second panel 30 and in overlying, face-to-face relationship with the floor 12 (FIG. 6).

A hinge of virtually any type may be utilized to pivotally attach the third panel 40 to the second panel 30. According to embodiments of the present invention, an upholstery material or floor covering (e.g., carpeting) disposed on the third panel 40 and second panel 30 may serve as a hinge.

Figure 7:
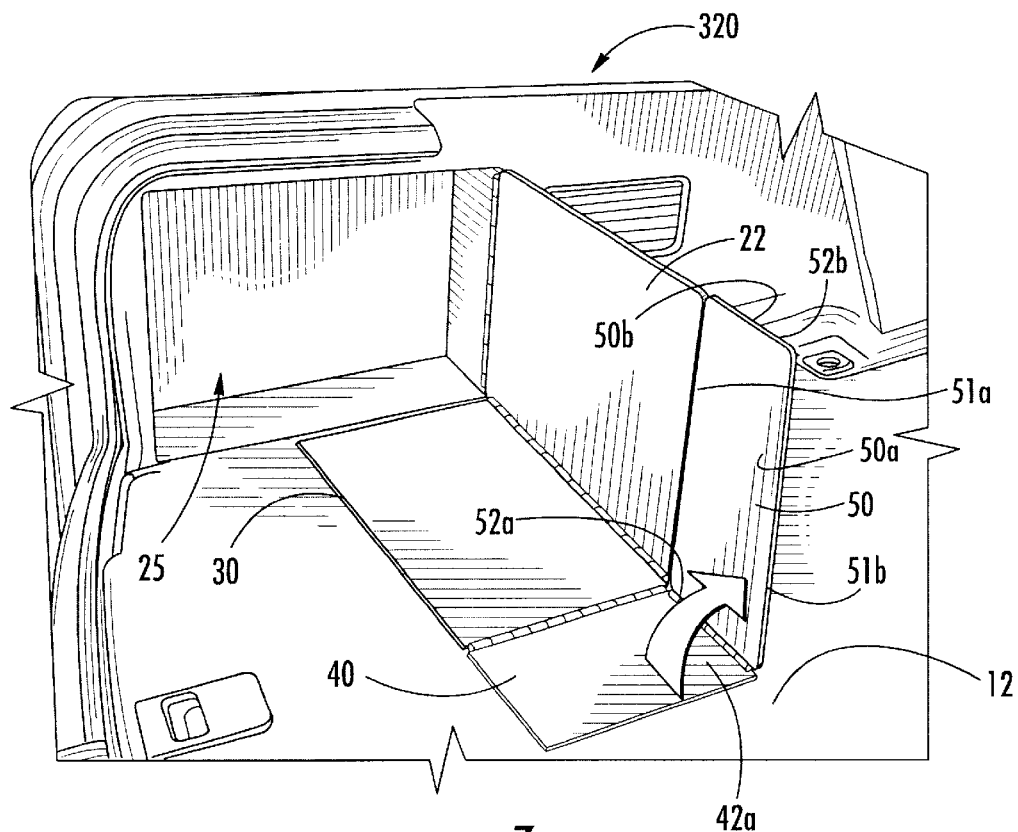

Referring to FIG. 7, a storage apparatus 320, according to other embodiments of the present invention, includes a fourth panel 50 that is pivotally secured to the third panel 40. The fourth panel 50 includes front and rear surfaces 50a, 50b, opposite seventh and eighth end portions 51a, 51b and opposite seventh and eighth edge portions 52a, 52b. The fourth panel 50 is pivotally secured to the third panel fifth edge portion 42a along the seventh edge portion 52a. The fourth panel 50 is movable between a stored position wherein the fourth panel 50 is in adjacent, face-to-face relationship with the third panel 40 and an operative position wherein the fourth panel 50 is adjacent to and substantially parallel with the cover panel 22 when the cover panel 22 is in its operative position (FIG. 7).

A hinge of virtually any type may be utilized to pivotally attach the fourth panel 50 to the third panel 40. According to embodiments of the present invention, an upholstery material or floor covering (e.g., carpeting) disposed on the fourth panel 50 and third panel 40 may serve as a hinge.

Figure 8:
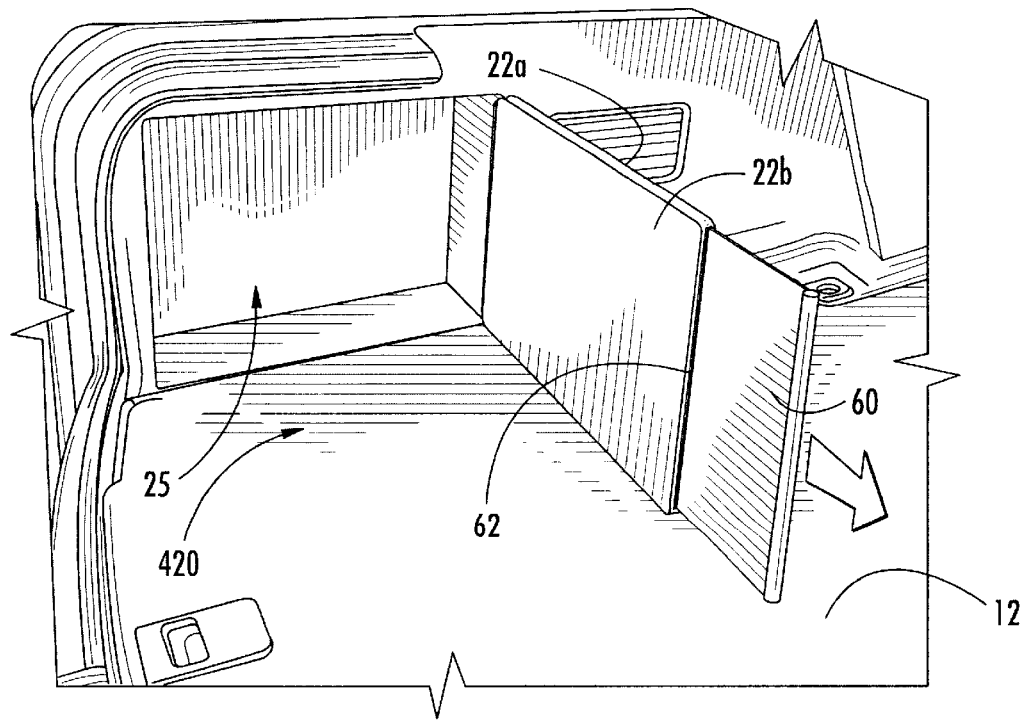

Referring to FIG. 8, a storage apparatus 420, according to other embodiments of the present invention, includes an extension panel 60 that is slidably secured to the cover panel 22. The extension panel 60 is movable from a stored position wherein the extension panel 60 is in adjacent, face-to-face relationship with the cover panel 22 and an extended position wherein the extension panel is substantially parallel with the cover panel 22 when the cover panel is in its operative position (FIG. 8). The illustrated extension panel 60 extends from slot 62 within panel 22. However, the extension panel 60 may be slidably secured to either surface 22a, 22b of panel 22. The extension panel 60 may be a solid panel or may be a flexible material, such as a web or netting.

Figure 9:
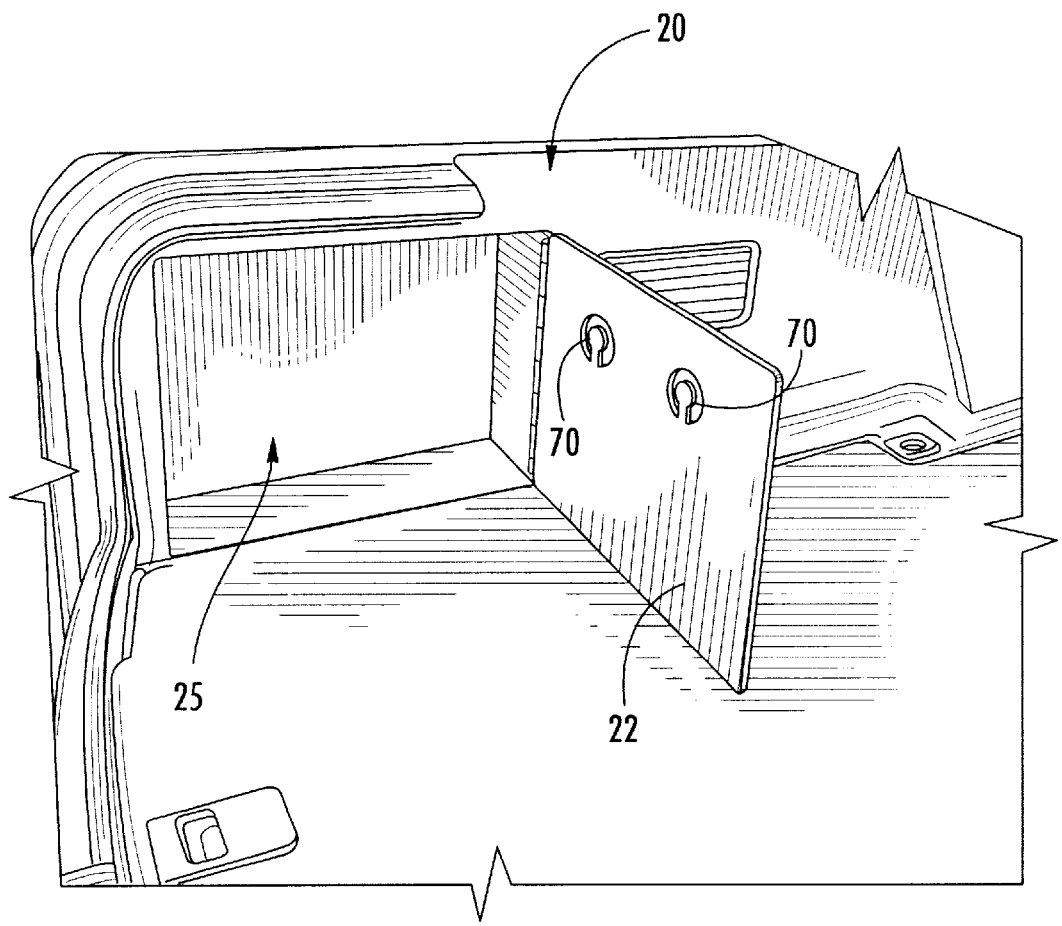

Referring to FIG. 9, the storage apparatus 20 of FIGS. 3–4, according to other embodiments of the present invention, includes one or more projections 70 extending from the cover panel 22, wherein each projection 70 is configured to support articles (e.g., grocery bags) suspended therefrom. The projections 70 may have various shapes and sizes. Embodiments of the present invention are not limited to the illustrated projections 70. Moreover, various numbers of projections may be utilized and projections may be utilized on one or more of the other panels (e.g., second, third, fourth and extension panels 30, 40, 50, 60).

The various panels of the storage apparatus 20 illustrated in FIGS. 3–9 are configured to facilitate retention of articles stored within a vehicle cargo compartment. Articles may be placed against the one or more panels to limit movement of the articles when the vehicle is in motion. In addition, various devices including, but not limited to, straps, cargo nets, and the like may be utilized in conjunction with one or more of the panels. The various panels 22, 30, 40, 50, 60 of the storage apparatus illustrated in FIGS. 3–9 may have various shapes and sizes and are not limited to the illustrated embodiments. For example, in addition to the generally rectangular configuration illustrated, each of the various panels 22, 30, 40, 50, 60 may have other shapes and configurations (e.g., round, triangular, square, polygonal, etc.) without limitation. Moreover, although not illustrated, stops may be provided in a cargo compartment floor to limit movement of one or more of the various panels.

The various panels 22, 30, 40, 50, 60 may be formed from various types of materials, including polymeric materials, wood, metal, and composites. Lightweight, durable materials, such as various polymeric materials, particularly recyclable polymeric materials, are preferred. In addition, each of the various panels 22, 30, 40, 50, 60 may be covered on one or more sides with various materials, such as carpeting, trim upholstery, sound attenuating materials, etc.

Embodiments of the present invention provide aesthetically clean and boxy appearances within vehicle trunks or other cargo compartments without sacrificing storage space. Various other types of cargo management systems may be integrated into embodiments of the present invention. More than one storage apparatus according to embodiments of the present invention may be utilized within a single vehicle cargo compartment. For example, two storage apparatus 20 may be utilized on opposite sides of an automobile trunk.

That which is claimed is:

1. An apparatus for storing items within a vehicle compartment, wherein the vehicle compartment includes a floor, a wall extending upwardly from the floor, and a storage area formed within the wall, the apparatus comprising:
    a cover panel pivotally secured to the wall and movable about a substantially vertical axis between a closed position covering the storage area and an open position substantially transverse to the wall allowing access to the storage area; and
    a second panel pivotally secured to the cover panel and movable between a stored position wherein the second panel is in adjacent, face-to-face relationship with the cover panel and an operative position wherein the second panel is disposed substantially transverse to the cover panel and in overlying, face-to-face relationship with the floor.

2. The apparatus of claim 1, further comprising a third panel pivotally secured to the second panel and movable between a stored position wherein the third panel is in adjacent, face-to-face relationship with the second panel and an operative position wherein the third panel is substantially parallel with the second panel and in overlying, face-to-face relationship with the floor.

3. The apparatus of claim 2, further comprising a fourth panel pivotally secured to the third panel and movable between a stored position wherein the fourth panel is in adjacent, face-to-face relationship with the third panel and an operative position wherein the fourth panel is adjacent to and substantially parallel with the cover panel when the cover panel is in its operative position.

4. The apparatus of claim 1, further comprising an extension panel slidably secured to the cover panel and movable from a stored position wherein the extension panel is in adjacent, face-to-face relationship with the cover panel and an extended position wherein the extension panel is substantially parallel with the cover panel.

5. The apparatus of claim 1, further comprising one or more projections extending from the cover panel, wherein each projection is configured to support articles suspended therefrom.

6. The apparatus of claim 1, wherein the cover panel is substantially flush with the wall when in the closed position.

7. A vehicle, comprising:
    a cargo compartment comprising a floor, a wall extending upwardly from the floor, and a storage area formed within the wall; and
    an apparatus for storing items within the cargo compartment comprising a cover panel pivotally secured to the wall and movable about a substantially vertical axis between a closed position covering the storage area and an open position substantially transverse to the wall allowing access to the storage area, and a second panel pivotally secured to the cover panel and movable between a stored position wherein the second panel is in adjacent, face-to-face relationship with the cover panel rear surface and an operative position wherein the second panel is disposed substantially transverse to the cover panel and in overlying, face-to-face relationship with the floor.

8. The vehicle of claim 7, further comprising a third panel pivotally secured to the second panel and movable between a stored position wherein the third panel is in adjacent, face-to-face relationship with the second panel and an operative position wherein the third panel is substantially parallel with the second panel and in overlying, face-to-face relationship with the floor.

9. The vehicle of claim 8, further comprising a fourth panel pivotally secured to the third panel and movable between a stored position wherein the fourth panel is in adjacent, face-to-face relationship with the third panel and an operative position wherein the fourth panel is adjacent to and substantially parallel with the cover panel when the cover panel is in its operative position.

10. The vehicle of claim 7, further comprising an extension panel slidably secured to the cover panel and movable from a stored position wherein the extension panel is in adjacent, face-to-face relationship with the cover panel and an extended position wherein the extension panel is substantially parallel with the cover panel when the cover panel is in its operative position.

11. The vehicle of claim 7, further comprising one or more projections extending from the cover panel, wherein each projection is configured to support articles suspended therefrom.

12. The vehicle of claim 7, wherein the cover panel is substantially flush with the wall when in the closed position.

* * * * *